(12) United States Patent
Guerin et al.

(10) Patent No.: US 7,525,920 B2
(45) Date of Patent: Apr. 28, 2009

(54) METHOD AND SYSTEM FOR PATH IDENTIFICATION IN PACKET NETWORKS

(75) Inventors: Roch Guerin, Newton Square, PA (US); Rajendran Rajan, Philadelphia, PA (US)

(73) Assignee: CoActive Technologies, Inc., Greenwich, CT (US)

( * ) Notice: Subject to any disclaimer, the term of this patent is extended or adjusted under 35 U.S.C. 154(b) by 1135 days.

(21) Appl. No.: 10/895,156

(22) Filed: Jul. 20, 2004

(65) Prior Publication Data

US 2005/0025059 A1    Feb. 3, 2005

Related U.S. Application Data

(63) Continuation of application No. 09/997,420, filed on Nov. 29, 2001, now Pat. No. 6,836,465.

(51) Int. Cl.
*H04J 1/16* (2006.01)
(52) U.S. Cl. .................. 370/238; 370/400; 709/241
(58) Field of Classification Search .................. None
See application file for complete search history.

(56) References Cited

U.S. PATENT DOCUMENTS

| | | | |
|---|---|---|---|
| 4,939,726 A | 7/1990 | Flammer et al. |
| 5,101,348 A | 3/1992 | Arrowood et al. |
| 5,115,433 A | 5/1992 | Baran et al. |
| 5,309,433 A | 5/1994 | Cidon et al. |
| 5,317,566 A | 5/1994 | Joshi |
| 5,323,394 A | 6/1994 | Perlman |
| 5,365,523 A | 11/1994 | Derby et al. |
| 5,398,012 A | 3/1995 | Derby et al. |
| 5,491,690 A | 2/1996 | Alfonsi et al. |
| 5,497,368 A | 3/1996 | Reijnierse et al. |
| 5,687,168 A | 11/1997 | Iwata |
| 5,754,790 A | 5/1998 | France et al. |
| 5,930,259 A | 7/1999 | Katsube et al. |
| 6,003,090 A | 12/1999 | Puranik et al. |
| 6,023,501 A | 2/2000 | Wakamatsu |
| 6,078,590 A | 6/2000 | Farinacci et al. |
| 6,097,718 A | 8/2000 | Bion |
| 6,108,710 A | 8/2000 | Brabson et al. |
| 6,119,170 A | 9/2000 | Schoffelman et al. |
| 6,205,146 B1 | 3/2001 | Rochberger et al. |
| 6,222,829 B1 | 4/2001 | Karlsson et al. |

OTHER PUBLICATIONS

J.D. Case, et al., "Simple Network Management Protocol", Internet Engineering Task Force, Request for Comments No. 1157, http://www.ietf.org/rfc/rfc1157.txt, May 1990.

(Continued)

*Primary Examiner*—Andrew Lee
(74) *Attorney, Agent, or Firm*—Pepper Hamilton LLP

(57) ABSTRACT

A method and system for extracting and building end-to-end route information in a multi-area Internet protocol (IP) autonomous system (AS) is disclosed. The method and system enable a user, such as a network administrator, to explicitly identify a full set of paths (links and routers) that a given IP packet would potentially traverse from its entry point in the source area of the AS where it originates until its exit point in its intended destination area.

16 Claims, 10 Drawing Sheets

OTHER PUBLICATIONS

Cisco Systems, "NetFlow FlowCollector 3.0 Documentation", http://www.cisco.com/warp/public/732/Tech/netflow/.

Juniper Networks, "Juniper Networks cflowd documentation", http://arachne3.juniper.net/products/network_mgmt_refs.html.

J. Moy, "OSPF Version 2", Internet Engineering Task Force, Request for Comments No. 2328, http://www.ietf.org/rfc/rfc2328.txt, Apr. 1998.

D. Oran, "OSI IS-IS Intra-Domain Routing Protocol", Internet Engineering Task Force, Request for Information No. 1142, http://www.ietf.org/rfc/rfc1142.txt, Feb. 1990.

| Time | RAQ ID | Area | Originating Node | Raw Data |
|---|---|---|---|---|
| 02:30 | 15 | 11 | 23.2.121.2 | 0110001... |
| 02:31 | 16 | 10 | 23.1.23.1 | 0110001... |
| 02:35 | 17 | 12 | 23.4.1.8 | 0110001... |

FIG. 7

METHOD AND SYSTEM FOR PATH IDENTIFICATION IN PACKET NETWORKS

RELATED APPLICATIONS AND CLAIM OF PRIORITY

This application claims priority to and incorporates by reference in its entirety, U.S. patent application Ser. No. 09/997,420 entitled "Method and System for Path Identification In Packet Networks" filed Nov. 29, 2001.

FIELD OF THE INVENTION

The present invention relates generally to a method and system for acquiring information from a packet communications network. More particularly, the present invention relates to a method and system for determining the set of links and routers that are traversed by traffic to and/or from an individual user of a packet communications network.

BACKGROUND OF THE INVENTION

An Internet protocol (IP) network is a large distributed system in which individual routers automatically adjust their decisions on how to forward packets based on information they learn from their neighbors about the state of the network. This design permits rapid recovery in case of link or router failures by allowing affected routers to re-route packets around the failure as soon as they discover it.

However, this distributed mode of operation and the associated robustness it affords come at a price. For example, accuracy in characterizing the behavior of the network at any given time is a complex task. Because of this, many of the network management functions that are available for networks based on more traditional technologies, e.g., connection-oriented such as frame relay or asynchronous transfer mode (ATM), are difficult if not impossible to replicate in IP networks. For example, in a connection-oriented network, the state associated with each connection/user provides the network administrator with a ready handle for tracing its path and monitoring the resources it relies on. In contrast, in IP networks because routing decisions are made in a distributed fashion by many routers that are only concerned with local packet forwarding decisions, there is no single entity with complete knowledge of the entire path that a packet will follow at any given time. Again, this makes it more difficult for a network administrator to precisely identify the path that the traffic between, for example, two customer sites, is following when traversing the network.

As a consequence, upon identifying a highly congested link, a network administrator has no or only limited visibility into which customers may be experiencing poor performance as a result of this congestion. Similarly, in the presence of a link failure, identifying which customers are immediately affected as well as predicting which ones may also experience a change in service performance shortly after the failure is again a very complex task in IP networks.

Management tools do exist for IP networks, but they are typically reactive or operate at a coarse granularity, i.e., not at the level of the end-to-end performance of an individual customer or site. For example, routers typically support standard Management Information Bases (MIBs) that can be queried using protocols such as the Simple Network Management Protocol (SNMP). MIBs provide detailed state information about individual routers, e.g., interface status, number of packets or bytes transmitted and received on each interface, etc. However, this information is local to each device, and does not offer a network wide perspective. Furthermore, piecing together MIB information from multiple routers to derive end-to-end performance measures of relevance to a given customer is not an easy task. A similar limitation exists when relying on traffic monitoring information that is routinely gathered at routers using mechanisms such as Cisco's NetFlow™ or Juniper cflowd™. These monitoring devices capture detailed information about the traffic crossing a given interface, but again do not have the ability to identify end-to-end paths. Converting such traffic monitoring data into end-to-end intelligence is a laborious task.

A few tools exist that are capable of end-to-end sampling of paths traversing an IP network. Most of them are based on two core utilities built into the Internet Protocol, ping and traceroute, which allow a network administrator to probe the network in order to generate estimates of end-to-end performance measures such as packet loss and delay, and record full path information. However, solutions based on utilities such as ping and traceroute often are not desirable because they are neither scalable nor capable of providing real-time information about the network behavior as a user experiences it.

Accordingly, it is desirable to provide an improved method and system for monitoring, tracking, and/or predicting the distributed routing state of an IP network.

The following is provided as additional background information about the Internet and Internet routing protocols to help the reader understand the context of the present invention:

The Internet is a global network that consists of multiple interconnected smaller networks or Autonomous Systems (AS). The delivery of packets across this Interconnection of Networks is carried out under the responsibility of the IP suite. In particular, routing protocols disseminate information that allows distributed decisions to be made on how best to forward packets towards their destination.

Internet routing protocols can be divided into intra-domain and inter-domain protocols, with inter-domain protocols communicating information between ASs, while intra-domain protocols are responsible for determining the forwarding of packets within each AS. This general architecture and the associated suite of protocols are rapidly becoming the de facto technology on which modern communication networks are built. This dominance extends from simple local area networks to large-scale, international carrier networks, and is largely due to the robustness and efficiency of networks built using it. In particular, IP networks are often referred to as "connectionless", and the delivery of data packets to their intended destination is performed through a number of "independent" decisions made by the routers to which a packet is being forwarded.

SUMMARY OF THE INVENTION

It is therefore a feature and advantage of the present invention to provide an improved method and system for monitoring, tracking, and/or predicting the routing path of one or more packets under an IP protocol.

In accordance with one embodiment of the present invention, a method of identifying a path of travel for a packet in a multi-area domain operated according to a link state routing protocol includes the step of receiving topology information from a plurality of individual areas in a domain. It also includes the steps of identifying a plurality of intra-area least cost paths from the topology information, and assembling a subset of the plurality of intra-area least cost paths into an end-to-end path between a starting address and a destination address. Each least cost path preferably comprises a series of routers, with links or networks between routers.

Optionally and preferably, in the identifying step, at least one exit point from the first area through which the destination address is reachable is identified, at least one least cost path segment within the first area between the starting address and at least one of the exit points is constructed, and at least one of the least cost path segments is selected to result in at least one selected first area least cost segment. As an additional option, the exit point from first area may be the destination address. The identifying step may also include identifying all exit points from the first area through which the destination address is reachable.

The identifying step may also include the step of, for at least one of the exit points associated with at least one of the selected least cost path segments, identifying a second area within the domain to which said at least one exit point is connected. The identifying step may also include the steps of identifying at least one exit point from the second area through which the destination address is reachable, constructing at least one least cost path segment within the second area between the at least one exit point of the first area and at least one exit point of the second area, and selecting at least one of the least cost segments within the second area to result in at least one selected second area least cost segment. Under this option, the assembling step may include connecting one of the selected first area least cost segments and one of the selected second area least cost segments. Also under this option, the exit point of the second area may be the destination address.

As a further option to the embodiment described in the previous paragraph, the second constructing and selecting steps may be repeated for one or more additional areas, and the connecting step may include connecting the least cost segments for all areas for which said steps have been performed. Optionally and/or additionally, each constructing step may include constructing all possible least cost path segments, and the assembling step may include connecting a plurality of the least cost path segments between the starting address and the destination address.

Any or all of the method elements described above may be embodied in instructions, contained on a computer-readable carrier, that are capable of instructing a computing device to perform the elements.

In accordance with an alternate embodiment of the invention, a method of storing historical routing information in a routing domain operating according to a link state routing protocol, includes the steps of storing a plurality of routing events advertised in a routing domain as they are received over time, and identifying a set of time instants for which a complete context of routing and topology information of the routing domain will be maintained. At each time instant identified in the identifying step, at least one time-stamped routing information context is constructed by storing data structures representing current topology and routing states of the routing domain. For each of the time-stamped routing information contexts, a time ordered list of routing events is constructed as the events are received over time until the next time instant identified in the identifying step. Optionally, the routing domain may be a multi-area routing domain, the time-stamped routing information contexts may logically be partitioned through the separate storage of information pertaining to each area in the routing domain, and the constructing step may include constructing a separate time ordered list of routing events for each area in the routing domain.

Also optionally, the embodiment described in the previous paragraph may include the step of specifying a starting point in the routing domain, a destination address in the routing domain, a starting time, and an ending time. It may also include the steps of reviewing the time-stamped routing information contexts to identify the context one having a time stamp that is latest yet still precedes contexts with a time-stamp preceding the starting time, and constructing at least one updated time-stamped routing information context by sequentially processing routing events from the time ordered list of routing events associated with the time-stamped routing information context until reaching the last routing event having a time-stamp that that precedes the starting time. It may also include the step of constructing path information between the starting point and the destination address using the updated time-stamped routing information context.

In accordance with an alternate embodiment of the invention, a method of identifying a path between a starting address and a destination address in a routing domain operated according to a link state routing protocol includes the steps of specifying an ordered list of routing events, providing a routing information context representing a starting topology and a routing state of a routing domain, constructing path information between a starting address and a destination address using the routing information context, updating the routing information context in accordance with a next routing event in the ordered list of routing events, and repeating the constructing and updating steps above until reaching a last routing event in the ordered list of routing events.

There have thus been outlined the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 7 illustrates an example of a raw advertisements table comprising a collection of information gathered by route acquisition modules.

DETAILED DESCRIPTION OF PREFERRED EMBODIMENTS OF THE INVENTION

A preferred embodiment of the present invention provides an improved method and system for monitoring, tracking, and/or predicting the routing path of one or more packets under an IP protocol.

The present invention allows a network administrator, network monitoring system, or other human or automated user to identify the path or paths followed or expected to be followed by any packet traveling though an AS, where the packet has a known entry point or address and a known or anticipated destination address. The destination address is associated with a routing entry, typically from a routing table, and the present invention constructs the path that was or is expected to be followed through the routing domain by the packet associated with the routing entry. Optionally and preferably, when more than one path is possible, the invention is capable of constructing the complete set of possible paths, any of which the packet may follow.

Figure 1:
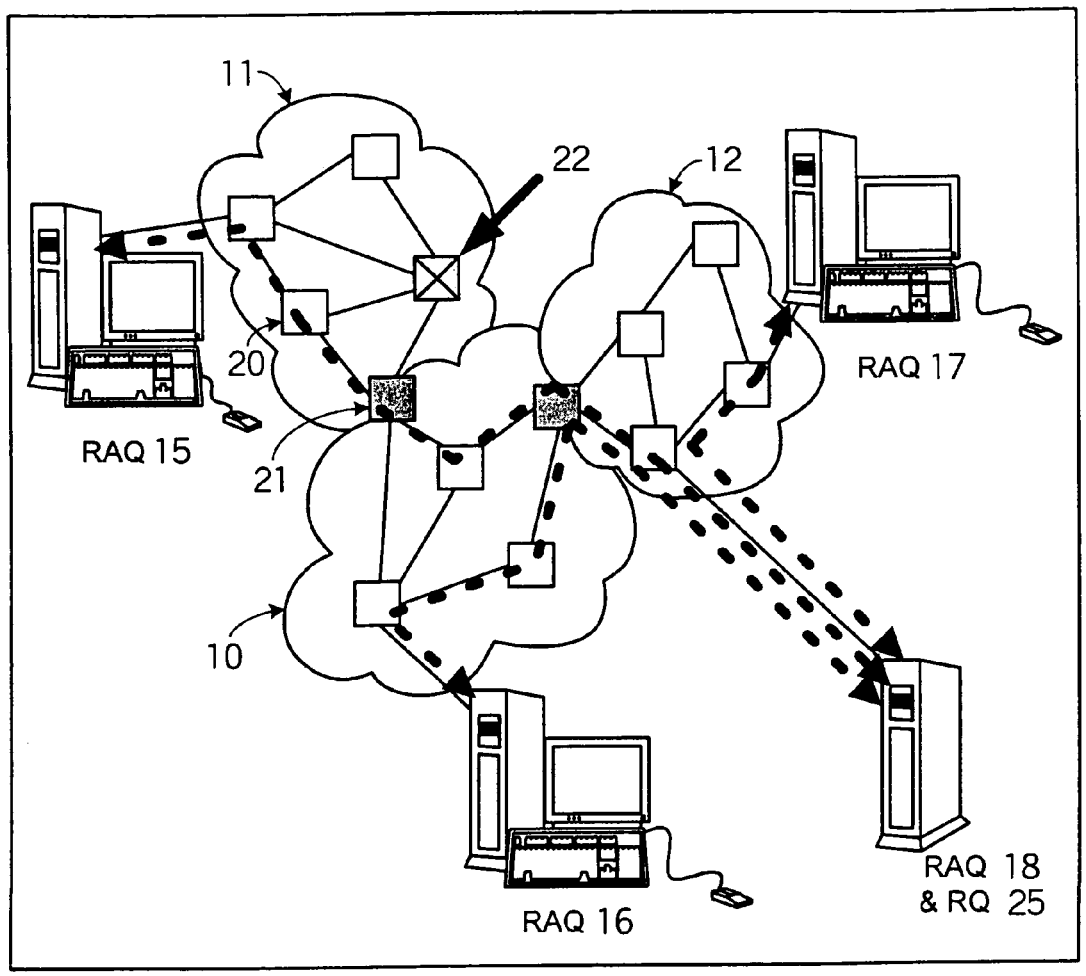
FIG. 1 illustrates an exemplary AS, or routing domain, where the present invention may be applied, including various elements of the AS such as areas, routers, route acquisition modules, a route aggregation module, an a route query module.

FIG. 1 illustrates an exemplary AS, or routing domain, where the present invention may be applied. The domain illustrated in FIG. 1 is not, of course, the only domain configuration in which the invention may apply, but it is only intended to serve as an illustration of one possible domain. Referring to FIG. 1, the illustrated AS includes three areas 10, 11, and 12. The present invention may also be used with an AS having more than three or fewer than three areas. The AS such preferably follows a link state routing protocol such as open shortest path first (OSPF) or ISIS. Each area typically includes a plurality of routers such as 20, 21, and 22 that direct and transport packet traffic between each other within each area, as well as to and from external routers in other areas. These may include: (1) area routers 20 that route information to and from other routers that are associated with a single area; (2) border routers 21 which serve as routers for two or more areas within the AS and provide for the passage of traffic from one area 11 to another area 10 and vice-versa; and (3) boundary routers 22, which serve as exit and/or entry points to and from the AS.

In accordance with the present invention, the AS includes one or more Route Acquisition (RAQ) modules 15, 16, and 17. Typically, there is one RAQ module for each area of the AS, although it is possible that an area may have no RAQ module or more than one RAQ module. The RAQ modules, which preferably have the features of a routing device, essentially serve as "stub-routers" and participate in the routing protocol of their respective area. This allows them to receive much or all of the routing information exchanged between routers in their area. In the context of a link state protocol, this information provides detailed background about the internal topology of the area, the set of addresses associated with the different routers in the area and the current state of various network nodes and interfaces. It may also provide summarized information regarding destinations in other areas and outside the AS, or how to reach them.

The exact structure and specification of the information received by the RAQ module depends on the routing protocol in use, but a key feature is that it provides information about the "cost" of reaching local destinations inside the area, as well as remote destinations through different "exit" points from the area. The "cost" refers to the distance that a packet must travel to reach a destination from a starting point. The cost may be directly related to a number of "hops" between routers. For example, referring to area 11 in FIG. 1, if the cost of traveling between each router were, for example, one, then the cost for a packet to travel from RAQ module 15 to router 21 via router 20 would be two, since it takes two "hops" to reach the destination: a first hop to router 20 and a second hop to router 21. Alternatively, if the cost of the link between router 21 and router 20 were, for example, three, then the total cost for the packet to travel from RAQ module 15 to router 21 through router 20 would be one plus three, which is four.

The AS also includes a Route Aggregation (RAG) module 18. One RAG module is the default configuration, but more than one RAG module is a possible option. The RAG module 18 receives and processes the information obtained by the RAQ modules, and is described in more detail below. The RAG module 18 may be any computing device, such as a PC, laptop, server, or individual work station having a processor and memory.

The RAG module 18 is in substantially constant communication with many, and preferably all, of the RAQ modules in the different areas of its AS. The RAG module receives from the RAQ modules the routing information that the RAQ modules have acquired through participating in the routing protocol of their individual area. The RAG module parses and processes this information to support the extraction of end-to-end (across the AS) path information, even across multiple areas. Thus, the RAG module performs a key function, as the routing information from individual routers typically only provides local path information specific to individual areas. The RAG module structures the routing information associated with different areas so as to facilitate its piecing together to create end-to-end paths in response to route queries.

The RAG module 18 includes a component referred to herein as the route storage sub-module (or, more briefly, the "storage module"). The storage module maintains information gathered by the RAG from the RAQs, both current and historical. Thus, the storage module is preferably sufficient to store a large quantity of information received from the RAQ modules. However, RAGs with smaller memory amounts can be used. When stored, historical information can be stored in raw (i.e., unprocessed) form or supplemented with one or more indices, tables, and/or summaries to enable rapid retrieval of historical state. This information can be used for both a playback, or path analysis, function and a play-forward, or predictive, function, each of which is described in more detail below.

The AS also includes at least one Route Query (RQ) module 25 that serves as an interface for a user, such as a network administrator, to retrieve information collected by the RAG module. The RQ module 25 may be a separate device, such as a computing device having an input/output port or communications port, or it may be co-located with another device. For example, FIG. 1 illustrates the RAG module 18 and the RQ module 25 as being installed on a single computing device. In fact, any or all of the modules described above can be considered functional units, and two or more of them may be co-located in the same physical device.

The RQ module 25 interfaces to the RAG module 18 and coordinates the process of retrieving complete path information from the data structures maintained by the storage module. The RQ module 25 accepts as inputs an identifier for the starting point within the AS for a path or route that is to be retrieved, and an identifier for the end point or destination for the path. The identifier of the starting point can be a host name or IP address local to the AS, i.e., belonging to one of the subnets in the AS, or be in the form of an interface number belonging to one of the routers in the AS, i.e., identifying the entry point into the AS. The identifier of the desired end-point or destination will typically be in the form of a host name or IP address, and need not be associated with a device that is local to the AS. In the case of a remote end-point, the path information that is returned extends from the (local) entry point in the AS to the exit point from the AS towards the next AS that is to be used in order to reach the remote destination.

Optionally, the RQ module 25 may also accept a time parameter to identify whether the information to be provided is a playback (i.e., analysis of a path previously traveled) or play-forward (i.e., predictive) response. For the play-forward embodiment, the RQ module may also accept additional events pertaining to "what-if" scenarios. The optional time parameter (which typically is coordinated with or relates to a clock associated with the RAG module) would identify the time at which state dynamics are sought to be represented. If the time indicated is in the future, additional events, identified as a sequence of (time, network element, state) may be accepted as input by the RQ.

As mentioned above, a RAQ module essentially serves the function of a "stub-router" that participates in the routing protocol of its own area. There will typically be one RAQ per area, although more than one could be deployed for redundancy purposes. In the context of a link state routing protocol, topology (i.e., structure of an area such as router addresses and cost between routers) and route information is flooded through each area, so that each router acquires a complete topological real-time map of its area and of the location of route entries. In addition, in each area, routers connected to other areas or other ASs, i.e., border routers (21 on FIG. 1) and/or boundary routers (22 on FIG. 1) also flood within each of their areas information regarding their ability to reach route entries that lie outside the area. The information may be as simple as stating that they can reach destinations in other areas (as would be the case in a domain following the ISIS protocol), or it may include the identity of the routing entries they have learned, the cost associated with reaching those routes when going through them, and/or other information items (as would be the case in a domain following the OSPF protocol). Routers inside an area use this information to determine how to forward packets along shortest paths towards the route entry that matches the packets' destination address.

Figure 2:
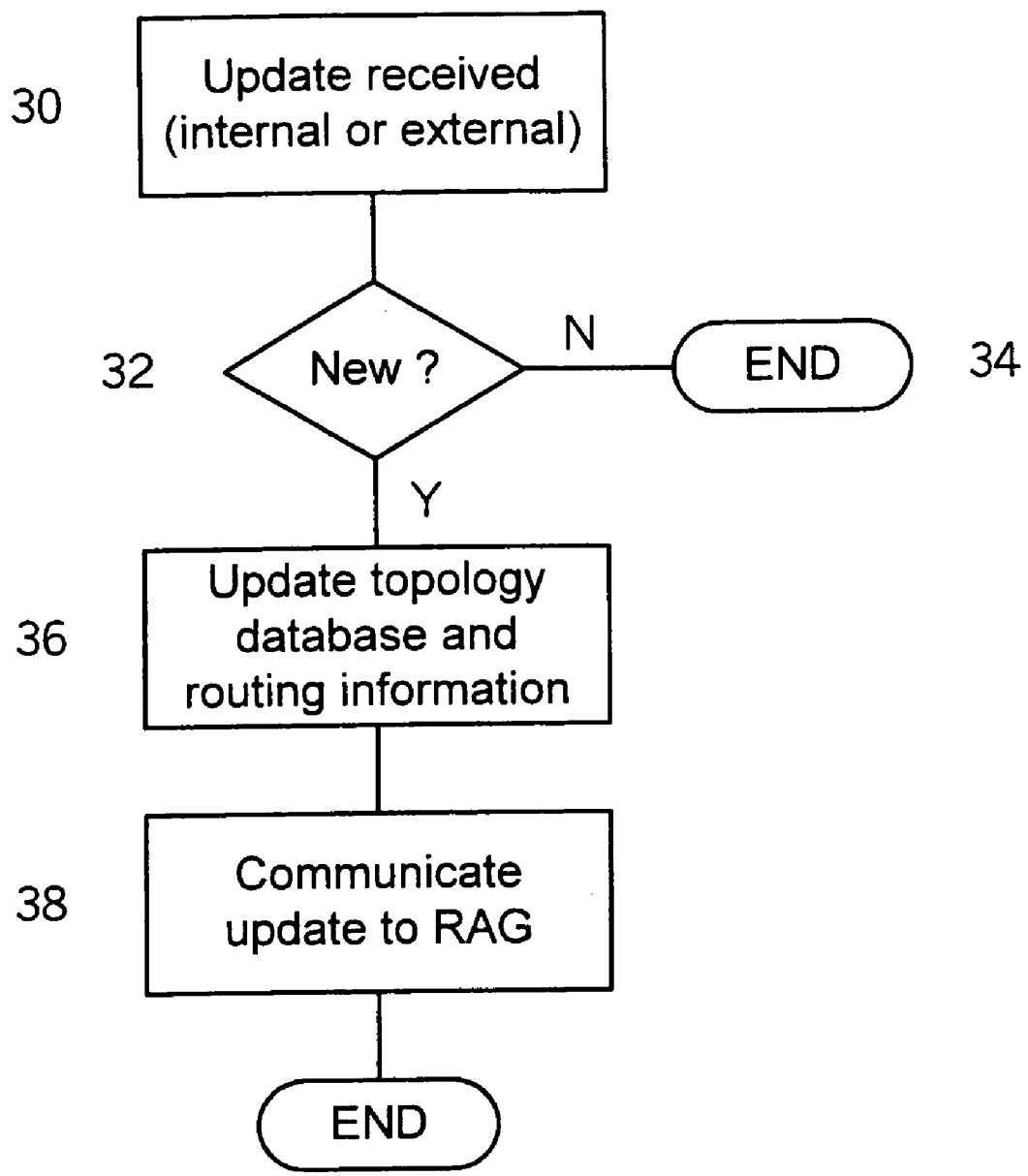
FIG. 2 illustrates exemplary steps that may be performed by a route acquisition module to gather topology information from an individual area in accordance with the present invention.

FIG. 2 illustrates exemplary steps performed by a RAQ module in accordance with the present invention. Referring to FIG. 2, as a result of participation in the flooding process, each RAQ module receives all updates pertaining to changes in routing and topology information (step 30). The RAQ is then responsible for making that information available to the RAG. Specifically, the RAQ receives information transmitted by its neighboring routers within the area and uses that information to build a topology database. Preferably, when updates are received that pertain to a topology element such as a router, a link and its cost, local route entries reachable from each router, and/or (for routers providing connectivity to other areas or routing domains) information regarding the reachability of remote route entries, the RAQ module checks the topology database to determine whether the information is new (step 32). If the information is not new, the RAQ module does nothing with the information (step 34) and watches for additional information (repeating step 32). If the update corresponds to new information, then the RAQ module updates its topology database with the new information (step 36), and it also forwards the updated or new information to the RAG module (step 38). The RAG module maintains a global topology database that contains information received from all RAQ modules in the AS with which it communicates.

In addition to changes caused by the receipt of an update from one of the RAQ's neighboring routers, there are other events that can affect the routing and topology information maintained by the RAQ. In particular, most link state routing protocols include various timer based "liveness" mechanisms to detect failures and remove out-of-date information from the topology database. The expiration of one such timer triggers the removal of a corresponding piece of information from the topology database. Such a change also needs to be reported to the RAG to ensure that its information is consistent with that maintained by the RAQ. In other words, the RAQ acting as a router maintains an up-to-date view of routing and topology information in its own area, and is responsible for ensuring that this information is conveyed to the RAG in a timely and reliable manner.

The topology database that the RAQ module builds provides it with substantially complete knowledge about routers and links (and their cost) in the RAQ module's own area, as well as possibly route entries reachable within and outside its own area or the identity of routers capable of reaching remote entries.

As noted above, the RAQ module is preferably any type of routing device that may be commonly found or used in the AS or in a comparable AS. In accordance with a preferred embodiment of the present invention, the RAQ module is not required to forward transit data. As a result, although it functionally appears as full-fledged router, the particular RAQ module used optionally can be one of relatively low-end technology.

Referring back to FIG. 1, the RAG module 18 collects and manages information assembled from the various RAQ modules 15, 16, and 17 into a form that is easily queried by the RQ module 25. There is typically one RAG per AS or routing domain, although a single RAG could be shared across multiple domains, and alternatively multiple RAGs could be used within the same domain for redundancy purposes. For simplicity, the preferred embodiment described herein assumes that there is one RAG serving a given routing domain. The RAG maintains a number of data structures used to store and organize the information it receives from RAQs in different areas.

Figure 3:
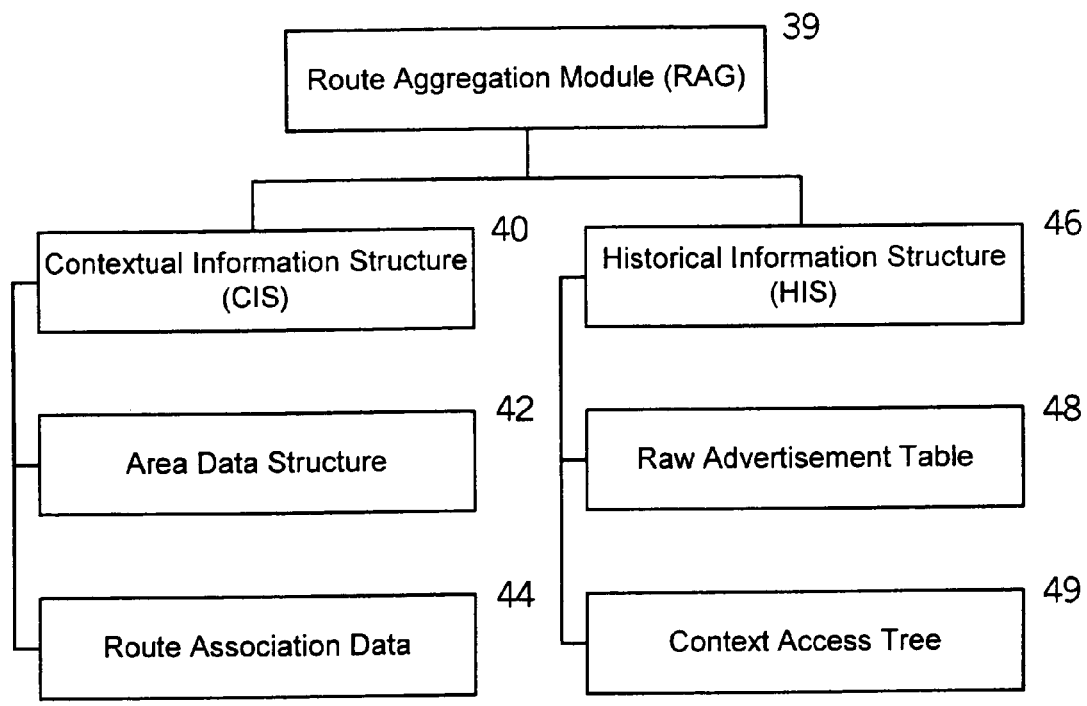
FIG. 3 illustrates the types of information and memory areas that may be allocated by a route aggregation module.

FIG. 3 illustrates the preferred types of information that may be received and memory areas that may be allocated by the RAG module. The RAG 39 maintains at least two sections or types of memory. The information includes two types of contexts. One context corresponds to the current routing domain state, while others are associated with past routing states. The first type, a Contextual Information Structure (CIS) 40, represents a snapshot of the routing state of the network at a particular instant, and can be searched to provide end-to-end (through the routing domain) path information in response to queries placed by the RQ module. The past routing states, together with raw-data received from the RAQs, processed event indices, and other structures pertaining to the past dynamics of the network, make up the historical information that the RAG maintains in the second type of memory, a historical information structure (HIS) 46.

The RAG module has two roles. In its downward-facing (or AS-inward) role, it communicates with the RAQs and assembles the updates that it receives from the RAQs. In its upward-facing (or AS-outward) role, the RAG module creates and deletes CISs in response to requests from the RQ module.

Each CIS includes at least one, and preferably several, several area data structures (ADS) 42, each with a corresponding route association data (RAD) structure 44. The CIS pieces together information received from different RAQ modules so that the information can be searched to provide end-to-end (through the routing domain or AS) path information in response to queries placed by the RQ module. This piecing together is achieved through a topology map that identifies how the different area data structures are linked together in the AS. Each ADS is essentially a replica of the area's topology database constructed in a manner essentially similar to how routers construct their own area topology database. This is made possible by the fact that the RAQs ensure that any update they receive is communicated to the RAG. In other words, the RAG receives all relevant updates from each area and uses them to reproduce the area topology databases that are separately maintained in each area by the RAQ for the area. Each topology database contains a list of all the routers in the area together with their links and networks, as well as adjacencies, i.e., the set of routers reachable through a given link or network. The information available from an area database allows the computation of shortest paths between any pairs of routers or interfaces in the area.

The ability to associate those shortest paths with route entries, and therefore destination addresses, is provided through the RAD structure 44. The RAD 44 is similar to the routing table that is maintained by each router, with the difference that instead of storing the set of next hops associated with the shortest paths computed by the router for each routing entry, the information that is kept is the identity of the router from which the route was learned. A primary function of the RAD is to maintain knowledge of which router a given route entry is associated with. A route entry is said to be associated with a router if the router is one that "advertised" reachability to the route entry.

Figure 4:
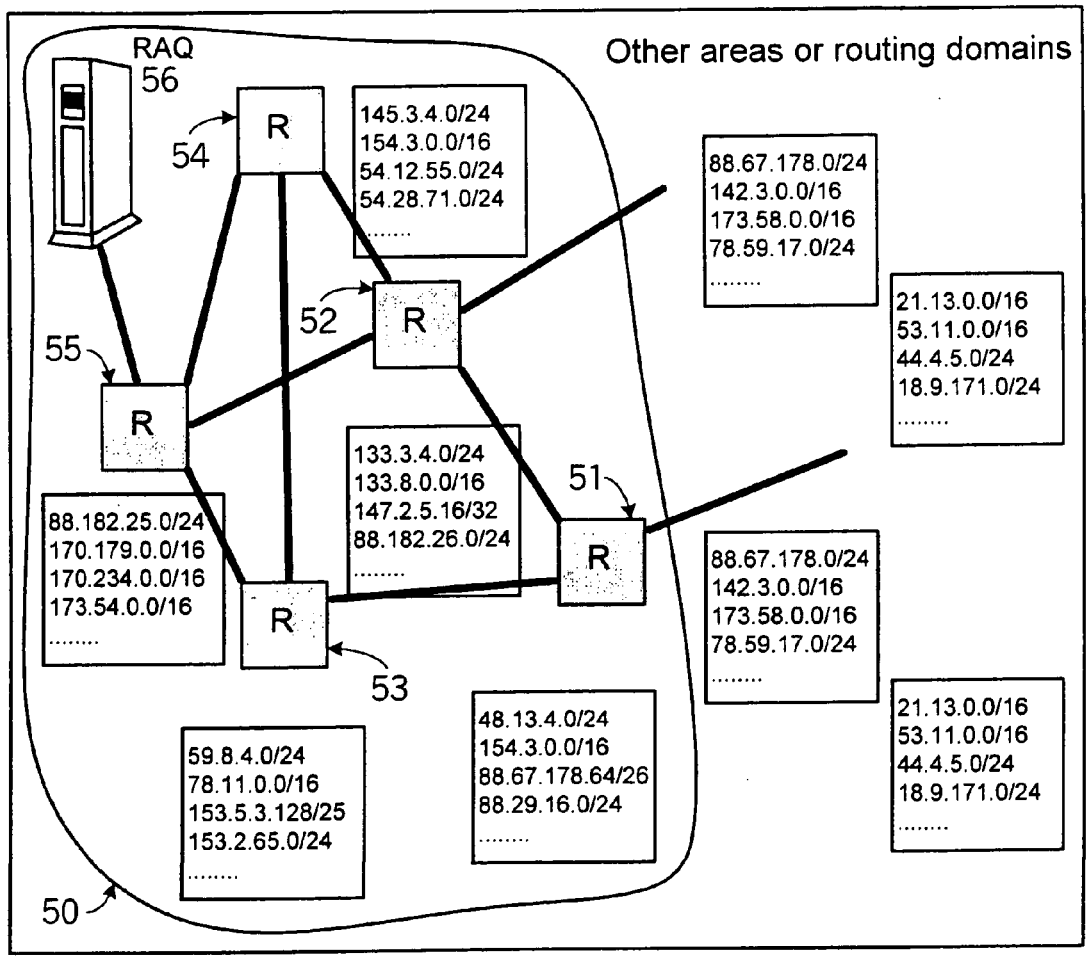
FIG. 4 illustrates the address information that may be used in order to identify specific routers, entry points, and/or exit points in an area.

The concept of advertising a route is illustrated in embodiment shown in FIG. 4, which illustrates an expanded version of a single area 50. Referring to FIG. 4, each router is associated with, or "advertises," a list of routes that are reachable from the router. For example, router 51 advertises both: (1) "area internal" routes, or routes associated with networks directly reachable from the router; and (2) "area external" routes, or, routes associated with networks located in other areas or routing domains. Route entry 48.13.4.0/24, which is advertised by router 51, is an example of an area internal route. Route entry 173.58.0.0/16, also advertised by router 51, is an example of an area external route. Note that association of a router with an area external route does not necessarily require an explicit advertising by the router that it can reach the route entry. It is possible for such an association to be implicit, i.e., the router is known to be associated with area external route entries. The RAD consists of a binary tree structure, such as a Patricia Trie (see FIG. 5) or an Adelson-Velskii-Landis (AVL) binary tree, that is commonly used in routers to allow the searching of route entries and retrieval of the entry that provides the longest prefix match for a given destination address.

As with the building of individual area topology databases shown in FIG. 2, the RAD is built as updates are received from the RAQs. Preferably, all the route entries received in an update are inserted in the RAD, although fewer than all may be inserted in alternate embodiments. If the route entry is already present, the router that originated the update through which the route entry was learned, or which in general becomes known as being associated with the route entry, is added to the set of routers with which the route entry is associated. If the route entry is not yet present in the tree, a new entry is created in the tree, and the set of routers with which the route entry is associated is initialized with the corresponding router. In the case of the receipt of updates that correspond to the withdrawal of a route entry, the inverse process is followed, i.e., the tree is searched for the route entries that are to be withdrawn and the router that issued the withdrawal is removed from the list of routers associated with the route entry. In case the router was the only one associated with the route entry, the entry is either deleted or marked as inactive. The inactive marking is useful when it is likely that the route entry will be added again in the near future.

Figure 5:
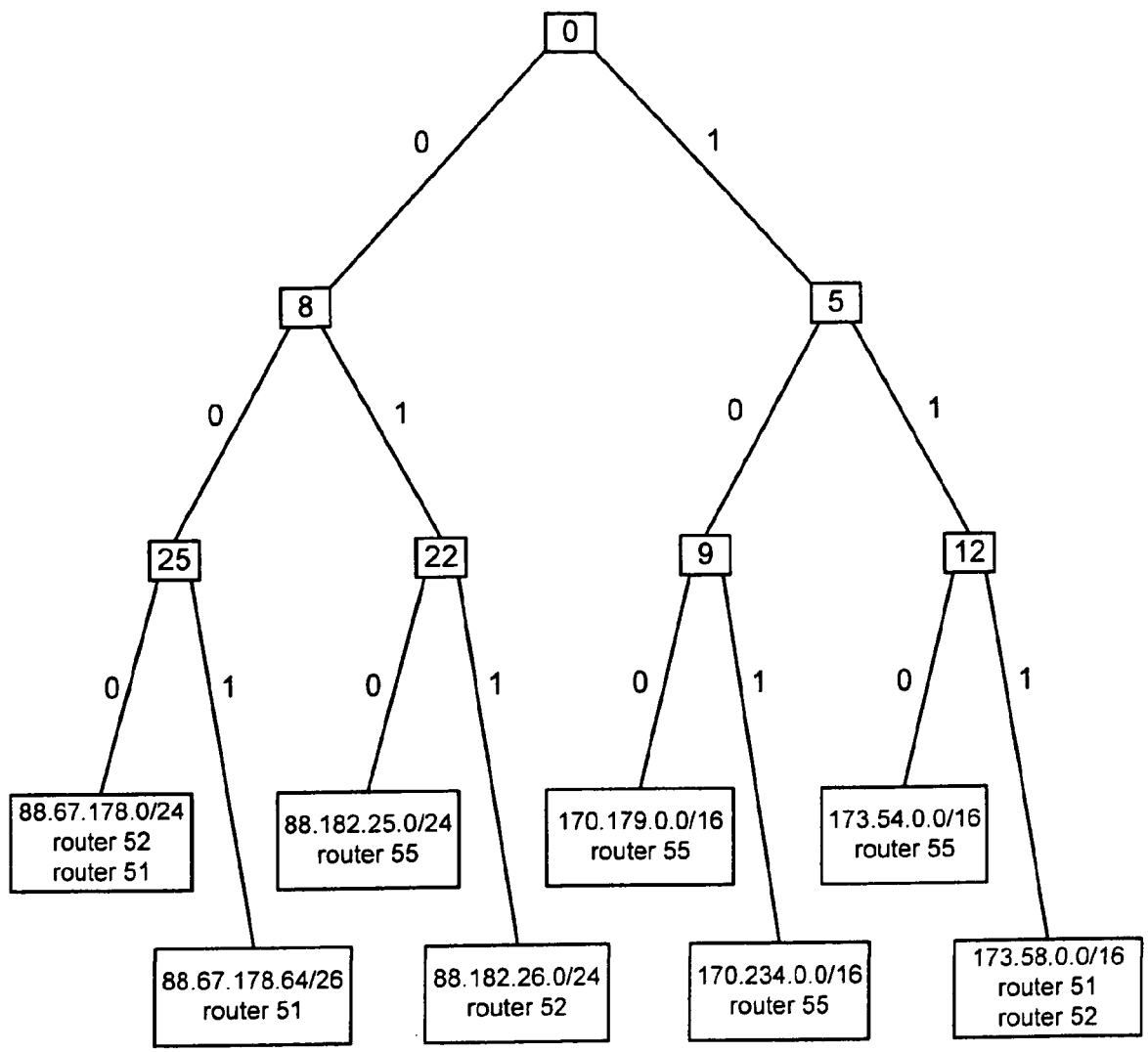
FIG. 5 illustrates a preferred data structure of route association data received from multiple areas of an autonomous system in accordance with the present invention.

FIG. 5 illustrates the structure of a RAD implemented using a Patricia Trie. The structure includes the routing entries that are known for an area, as well as the routers that are known to be associated with (i.e., capable of reaching) each routing entry. Route entries are stored at the leaves of the Trie and include the list of routers associated with them. The nodes of the Trie illustrate exemplary bit positions. For example, FIG. 5 illustrates an example where route entry 173.58.0.0/16 is advertised in the area by both routers 51 and 52 (of FIG. 4), and as a result the identity of the two routers is included in the entry kept for 173.58.0.0/16.

Figure 6:
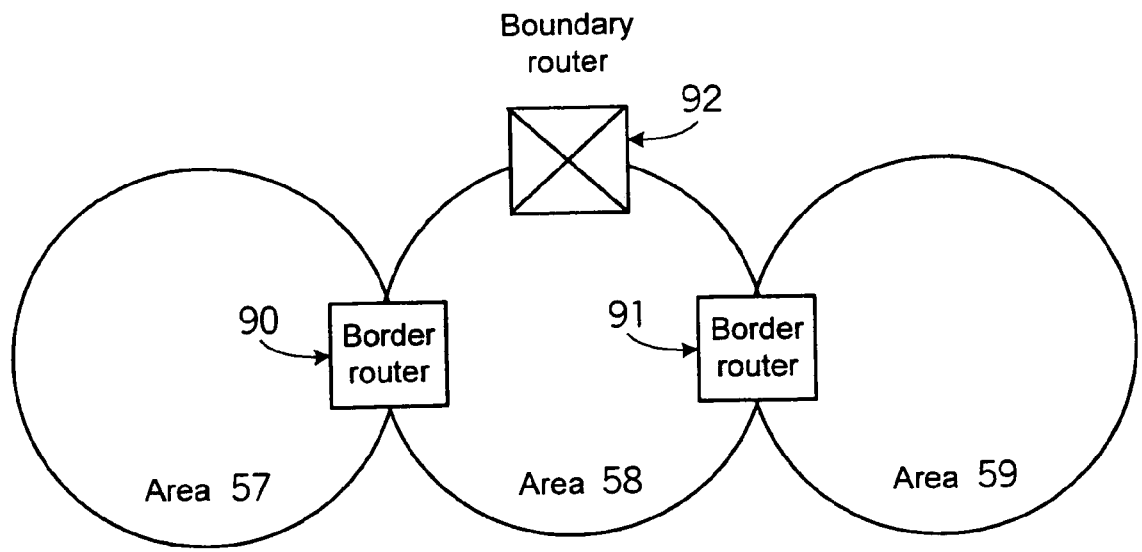
FIG. 6 is an example of an area-level map showing known boundary routers and known border routers for an autonomous system or routing domain.

The RAG module also keeps a data structure, a topology map that provides information needed to determine how the different areas are connected to each other, and for identifying routers that provide connectivity to outer routing domains. This information is readily obtained by identifying routers that advertise the ability of reaching routes in other areas or outside of the AS. Based on that information, the RAG constructs an "area-level" map of its routing domain, which is a high-level map showing only routers connecting areas or connecting to other routing domains. An example of such a map is shown in FIG. 6.

The combination of area-level topology and per area detailed topology maps provides the RAG with complete knowledge for determining the set of (shortest) paths actually followed by packets when crossing the routing domain. In addition to maintaining such knowledge for the current state of the network, the RAG also keeps track of past routing states so as to be able to respond to path queries that pertain to time instants in the past. As mentioned earlier, this information is kept in a portion of memory referred to herein as the RAG Historical Information Structure (HIS).

Historical information is useful to support "playback" queries used to identify how paths evolved in response to past changes in the network routing state. The information maintained for this purpose consists of a Raw Advertisements Table (RAT) that includes all updates gathered by the RAG from the RAQs, as well as a Context Access Tree (CAT) that organizes a combination of contexts and updates into a tree structure for easy recovery of past network dynamics. The RAT is a fairly simple structure that keeps a list of events received from various RAQs. It organizes updates based on the time received, the RAQ and area from which the message originated, the network node that originated the advertisement, as well as the raw update itself. An exemplary RAT is illustrated in text form in FIG. 7.

Figure 8:
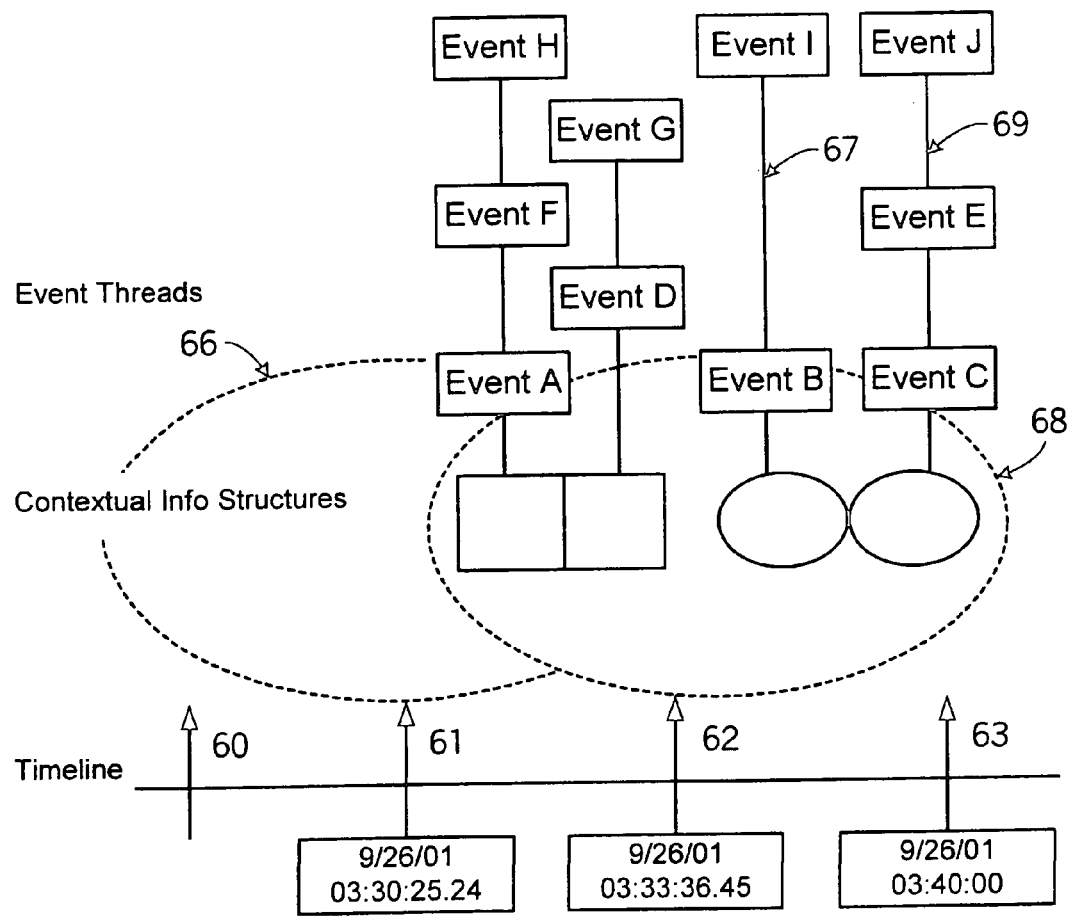
FIG. 8 illustrates a preferred embodiment of a structure of a context access tree that illustrates the format of the data structures used to capture the evolution of the network state over time.

In contrast, the CAT is a more complicated structure. An exemplary CAT is illustrated in FIG. 8. As shown in FIG. 8, the CAT comprises a timeline with various nodes 60, 61, 62, and 63, each of which contains a contextual information structure (CIS) such as 66 and 68 corresponding to a snapshot of the network at a point in time. Linked to each component of the CIS (each area data structure and its RAD) is a time-ordered lined-list of events such as 67 and 69, each of which corresponds to an update that caused a change in the state of the component. This hybrid structure, i.e., the combination of raw information and complete routing state as maintained in the CISs at different time-instances, provides an efficient trade-off between minimizing the amount of information that needs to be stored and allowing for the rapid reconstruction of the CIS associated with any given time instant in the past.

By storing this information in the HIS, the RAG is able to answer queries that pertain to any given routing state, both present and past. The initiation of queries is performed through the RQ module described below, which is responsible for accessing the different data structures maintained by the RAG.

The RQ module is responsible for returning a complete, end-to-end path, or set of such paths, in response to a route query specifying a starting point or origin in the routing domain and a destination address, possibly located outside of the routing domain. The RQ module is capable of answering two different types of route query—instant queries and persistent queries. Instant queries require single-shot responses in the form of a complete, end-to-end path or set of paths. Persistent queries, on the other hand, seek to track the dynamics of a complete, end-to-end path or set of paths over time. There are multiple types of persistent queries based on the conditions under which path dynamics are to be tracked. We distinguish between standard persistent queries, playback persistent queries, and play-forward persistent queries. Additional types of queries are possible, but are not required to practice the present invention.

A standard persistent query is similar to an instant query with the one difference that the query is to be persistently reissued each time a routing update is received (at the RAG) that has the potential to affect the path or set of paths that was previously returned. In other words, a standard persistent query tracks the evolution of a path or set of paths over time, as events, e.g., link or router failures, affect the routing state in the routing domain.

A playback persistent query specifies a starting time in the past and its goal is to track the evolution of a path or set of paths from that point on over a given period of time. In the context of a playback query it is then possible to step through events that have occurred over a period of time in the past, and for each identify which impact, if any, it had on the path or set of paths that were initially in effect.

A play-forward persistent query is similar to a playback query in that it specifies a starting time, possibly in the past, and requires stepping through a set of events in order to identify their impact on the path or set of paths that were initially returned. The main difference between a play-forward query and a playback query is that with a play-forward query, the set of events that are to be used can be specified as part of the query, in order to allow experimenting with different "what if" scenarios and their impact on routing.

Because it only needs to be responsible for retrieving path information from the RAG and possibly updating it in response to routing updates, the structure of the RQ module is optionally and preferably much simpler than that of the other modules. The RQ only needs to maintain path structures that have been returned in response to previous queries, although maintenance of other information is possible but not necessary to practice the present invention. Specifically, for each active query session the RQ keeps both (1) the information that was initially provided when the query was first issued, and (2) all subsequent path structures that were returned in response to the query. In the case of an instant query, this consists of only the origin that was specified for the path, the desired destination address, and the path or set of paths that were returned by the RAG. In the case of a persistent query, the RQ needs to also maintain all intermediate path structures that were returned in response to events that affected the original path structure. The set of events that were considered also needs to be kept.

The operation of the system described in the preferred embodiment may be described in response to five principal triggers: (1) RAQ initialization, (2) RAG initialization, (3) RQ initialization, (4) Routing update arrival at a RAQ and at the RAG, and (5) Query arrival at the RQ. A description of each event follows:

RAQ initialization: The RAQ initialization has two parts. The first is essentially the initialization phase, such as that which may be followed by a typical router in the routing domain. It consists of a device level initialization followed by a set of procedures aimed at ensuring that all routers in a given area of the routing domain have consistent routing information. In the case of a RAQ that acts as a stub router, this will amount to providing its own routing information to its neighboring router(s) and acquiring its (their) routing information. The second part of the RAQ initialization is concerned with the establishment of a communication channel with a RAG and with the initial exchange of routing information with it. The RAQ first retrieves, e.g., from a configuration file, the address of the RAG with which it needs to communicate and proceeds to initialize their communication channel. Once this step has been carried out, and assuming that the first part of the RAQ initialization has completed, i.e., it has acquired stable routing information, the RAQ initiates the transfer of its topology database and associated data structures to the RAG. The RAQ initialization terminates after this next step.

RAG initialization: The RAG initialization is also carried out in multiple phases. The first phase consists of device initialization and the creation of global data structures associated with the routing domain for which the RAG is responsible. It also includes the initialization of the procedures needed to enable future communications between the RAG and the different RAQs in the routing domain. For example, this can mean listening on a well-known port number or registering for notification of certain event types. Once this first phase has completed, the RAG is ready to receive information from the RAQs and will go through additional initialization procedures each time it discovers a new RAQ. The initialization procedures associated with the discovery of a new RAQ include the creation of the corresponding area data structures described in the description of the RAG above. In other words, the RAG creates a new area structure and also updates its routing domain level structure to reflect the existence of the new area. Information regarding the area's internal topology and overall connectivity in the routing domain is then added as it is received from the RAQ. This second phase completes after the RAQ finishes communicating its initial routing and topology information to the RAG.

RQ initialization: The RQ initialization procedures are optionally and preferably relatively minimal. Preferably, they include little more than contacting the RAG(s) associated with the routing domains the RQ is serving and retrieving from them relevant information that needs to be made available through the RQ User Interface. The identification of the relevant RAG(s) is typically provided through local configuration.

Routing Update: Routing (and topology) updates are transmitted by the RAQs to the RAG and are responsible for ensuring that the RAG maintains accurate information regarding the routing state of its routing domain. A RAQ determines that it needs to forward a routing update to the RAG whenever it itself receives an update (internal or external) that results in the modification of its own topology database. The resulting change must then be communicated to the RAG, which triggers the generation of a routing update by the RAQ. Upon receipt of the routing update, the RAG first identifies the area with which it is associated. This information is available through association with the identity of the RAQ that transmitted the update. Once the relevant area has been identified, the RAG accesses the corresponding CIS and proceeds to modify it in order to reflect the changes advertised in the routing update.

The nature of the changes required depends on the nature of the routing update. For example, the changes may range from the modification of an existing data structure or field, to the deletion of an existing data structure, to the creation of a new data structure. For example, a routing update that advertises a new cost for a link will result in the corresponding value being modified in the ADS. A routing update associated with the deletion or failure of a link or a router will result in the removal of the corresponding data structures of fields in the ADS. Conversely, a routing update associated with the introduction of a new link or a router will result in the creation of data structures necessary to represent those new entities in the ADS. Furthermore, in both cases, the RAD will also be correspondingly modified. In the case of a link or interface failure, it may be necessary to remove the attached router from the list of routers through which any associated route entry is reachable. For example, a router that loses connectivity to a given subnet must be removed from the list of routers associated with the route entry corresponding to the subnet, and if the router was the last one in the list, the route entry needs to be marked as unreachable or deleted. The case of a router failure is similar even if it typically requires more changes.

In addition to triggering potential modifications to the current CIS maintained by the RAG, the receipt of a routing update also affects the HIS at the RAG. Specifically, any received routing update should be added to one of the link lists of events maintained for the last CIS stored in the CAT, as well as to the RAT that keeps track of all the routing events received by the RAG. Finally, the receipt of a routing event can also trigger the storage of a new CIS in the CAT. Specifically, CISs may be stored in the CAT at regular time intervals, or after a given number of routing updates have been received, or according to some combination of those two criteria. In particular, imposing an upper bound on the number of routing updates that can be linked to a given CIS stored in the CAT is desirable to ensure that the CIS associated with an arbitrary time instant can be reconstructed within a reasonable amount of event processing.

Query Processing: The operation of the RQ module on the arrival of a query can be decomposed into a query initialization phase followed by a set of area specific steps and cross-area steps and is described in FIG. 9 in a flowchart format. The query initialization phase includes the following steps: Step 100: The system Determine if the appropriate CIS exists for handling the query. Step 102: If the appropriate CIS does not exist, the RAG creates it. Step 104: The RQ module identifies the source area associated with the starting point or origin of the path. Step 106: The RQ module identifies the origin router associated with the starting or entry point of the path in the source area. Optionally, more than one entry point may be considered.

Steps 100 and 102 come into play in the context of playback or play-forward queries that may not start from the current CIS, but which require the extraction of a CIS corresponding to the time instant from which the playback or play-forward scenario is to start. Specifically, when a query pertains to a time instant different from the current time, it is necessary to first recreate the routing state of the routing domain at that time instant. Thus, step 102 is accomplished by retrieving the necessary information from the HIS maintained at the RAG. The first step in this process consists of searching the CAT to identify the CIS with the latest time preceding the time instant from which the query is to start. In other words, the CAT is searched until a CIS is found that represents the full state of the routing domain at the latest time instant prior to the query starting time. Once the corresponding CIS has been identified, the list of routing events attached to the CIS is processed until all events anterior to the query starting time have been accounted for. The resulting CIS describes the routing state of the routing domain, as it existed at the specified starting time of the query. For example, when referring to FIG. 8 and assuming a desired query starting time of 03:40:00 on Sep. 26, 2001, the search of the CAT would terminate at the CIS that was stored at 03:33:36.45 on Sep. 26, 2001, as it corresponds to the last CIS stored prior to 03:40:00 on that day. However, this CIS does not represent the correct routing state at the desired query starting time. In order to recreate the CIS in effect at 03:40:00 on Sep. 26, 2001, it is necessary to process all the routing update events that are attached to the CIS stored at 03:33:36.45 on Sep. 26, 2001 and that were received prior to 03:40:00.

Figure 9:
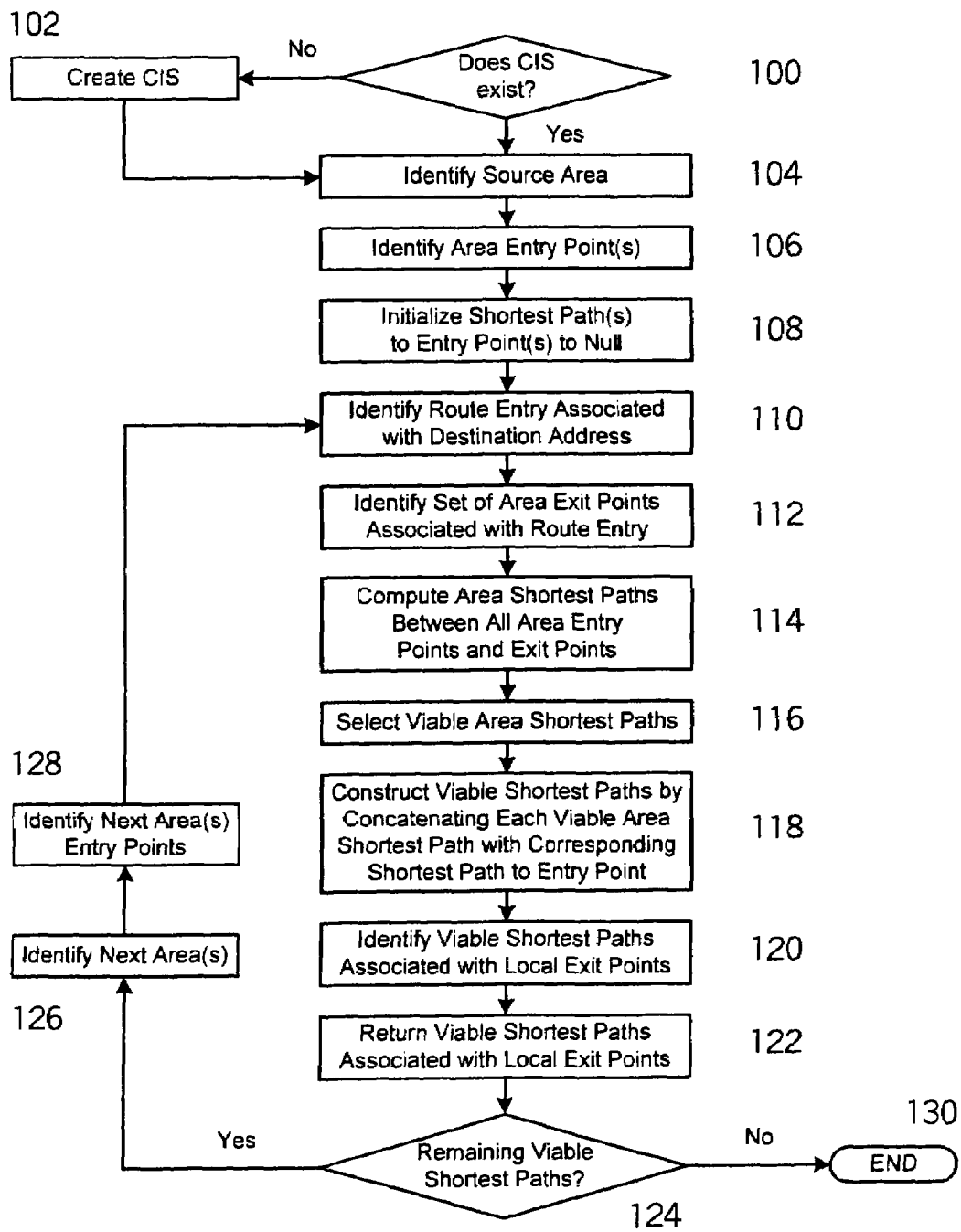
FIG. 9 illustrates, in flowchart form, a preferred embodiment of the method of processing a query for a route identification in accordance with the present invention.
Figure 10:
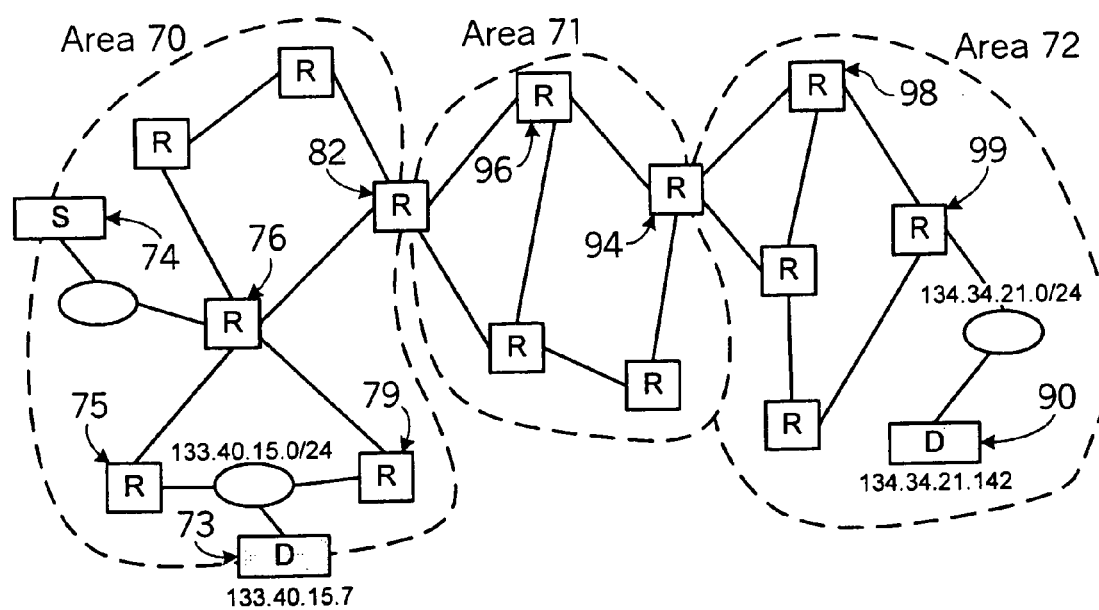
FIG. 10 illustrates an exemplary routing domain containing a starting point, destination addresses, multiple areas, and multiple routers within each area.

Once the appropriate CIS has been retrieved, the next two steps of the initialization performed when a new route query is received are best illustrated by referring to both FIG. 9 and FIG. 10. For this configuration, step 104 of FIG. 9 returns Area 70 of FIG. 10 as the source area for the specified origin point "S" 74, while step 106 of FIG. 9 identifies router 76 (of FIG. 10) as the starting point for paths that are to be returned in response to the route query.

Once the query initialization steps have been performed, referring again to FIG. 9, an area-specific set of steps is initiated and proceeds as follows: Step 108: Optionally and preferably, the shortest path segment from the entry point or points will be initialized to a null value. Step 110: Identify the route entry associated with the specified destination address. Step 112: Identify the exit points in the area that are associated with (i.e., that can reach) the route entry. Step 114: Compute shortest paths between the entry point or points and all exit points identified in step 112. If multiple shortest paths are available, preferably all such shortest paths are identified in this step. If multiple shortest paths have been identified, then the system selects those that are viable for reaching the destination address (step 116).

If previous paths have been calculated (such as those which may exist in other areas), then the system combines those with the paths determined in step 116 (step 118) and identifies the combinations that terminate in the current area and/or are associated with area local exit points (step 120). The system then returns the paths that are complete (step 122) and checks to see if there are other paths (i.e., other areas) that need to be checked (step 124). In cases where the destination address lies either in another area or in another routing domain, additional areas may have to be traversed before a complete set of paths is returned. If there are no other areas, then the path or paths have been identified and the process ends (step 130), typically by returning a report of the shortest path or paths. If another area or areas need to be checked, the system identifies the next area or areas (step 126), identifies the entry point for each such area (step 128), and repeats the process from step 110.

The purpose of steps 110, 112, 114 and 116 is to compute, within a particular area, shortest paths between the specified origin point and all the routers through which the destination could ultimately be reached. Note that when the destination address is associated with a route entry directly reachable from one or more of the routers in the source area, the route query typically terminates at this point. Specifically, when the destination address is associated with an "area-local" route entry, i.e., a route entry associated with a network directly attached to one or more of the area routers, then the RQ determines that all shortest paths between the specified origin and the destination address lie within the area. An exemplary identification of shortest paths within an area can be found in FIG. 10. For example, referring to FIG. 10, if the specified destination address is D1, i.e., 133.40.15.7. In this case, step 114 of FIG. 9 above would return two shortest paths, namely, S-R4-R5-D1 and S-R4-R6-D1. Since address D1 is "local", i.e., both R5 and R6 are connected to subnet 133.40.15.0/24, the query process would stop there and those two paths would be returned.

Referring again to FIG. 10, consider in turn destination address 90 (134.34.21.142) that is associated with a local route entry in area 72, i.e., a different area than that of the origin of the route query (area 70). The Route Query process starts by returning route entry 134.34.21.0/24 as the one associated with the intended destination address 90 and identifies router 82 as being capable of reaching the route entry. Shortest paths are then computed between routers 76 and 82. In this example, a single shortest path (76-82) of distance one (all links are assumed to have unit weight) is returned.

Because destination 90 is not local to area 70, the shortest path 76-82 needs to be extended out of area 70. Note that since it is the only possible shortest path, there is no need to identify which shortest path is to be extended. The next step identifies area 71 as the area in which the shortest path needs to be extended, and router 82 represents the "origin" in area 71 from which the extension needs to be performed. The path extension carried out in area 71 follows the same set of steps as those carried out when computing shortest paths within area 70. It starts with a Route Query that identifies the route entry associated with the destination address 90 134.34.21.142 in area 71. The route query again returns 134.34.2.0/24 and identifies router 94 as being able to reach the destination. The next step consists of computing a shortest path between routers 82 and 94 through area 71. This returns one shortest path 82-96-94 with a distance (in area 71) of two. When concatenated with the initial shortest path segment (76-82) computed in area 70, this returns an extended path segment 76-82-96-94 with a total distance of three. Because destination 90 is still not local to area 71 the path extension process needs to be again repeated for the next area, area 72. This eventually completes by returning the end-to-end path 76-82-96-94-98-99 that has a total distance of five.

Note that the above example only illustrates the general steps of the path computation process as it proceeds through multiple areas, and is not meant as a comprehensive description of all possible scenarios. Configurations involving multiple shortest paths within an area and/or multiple possible exit points from an area will give rise to slightly different intermediate steps that can be identified in reference to FIG. 9.

The previous examples were cast in the context of an "instant query", so that the query processing terminates at that point. On the other hand, if the query is a persistent query, additional processing is required to track path dynamics through the set of events that the persistent query targets. In the case of a standard persistent query, the RQ module registers with the CIS to be notified of routing updates as the RAG receives them. On receiving any such update the RQ module may query the CIS again, if it perceives that a path change is likely. In the case of playback or play-forward persistent queries, the processing of the query continues while stepping through the list of routing updates associated with the query.

The many features and advantages of the invention are apparent from the detailed specification. Thus, the appended claims are intended to cover all such features and advantages of the invention which fall within the true spirits and scope of the invention. Further, since numerous modifications and variations will readily occur to those skilled in the art, it is not desired to limit the invention to the exact construction and operation illustrated and described. Accordingly, all suitable modifications and equivalents may be included within the scope of the invention.

What is claimed is:

1. A method of identifying a path between a starting address and a destination address in a routing domain operated according to a link state routing protocol, comprising:

specifying an ordered list of routing events, wherein the ordered list comprises a list of all routing events received after a routing information context was constructed, wherein the routing information context represents a starting topology and a routing state of a routing domain;

providing the routing information context;

constructing path information between a starting address and a destination address using the routing information context;

updating the routing information context in accordance with a next routing event in the ordered list of routing events; and repeating the constructing and updating steps above until reaching a last routing event in the ordered list of routing events.

2. A method of identifying a path of travel for a packet in a multi-area domain operated according to a link state routing protocol, comprising the steps of:

for each current area along a path of travel, wherein the path of travel has an origin and a destination:

receiving first topology information pertaining to at least one non-local area, identifying a source for the current area, wherein if the current area includes the origin, the source for the current area is the origin, wherein if the current area does not include the origin, the source for the current area corresponds to an exit point for a previous area along the path of travel, identifying one or more exit points from the current area through which the destination is reachable, determining second topology information based on the source and the one or more exit points, selecting an exit point from the one or more exit points, wherein the selected exit point represents a least cost path to the destination based on the first topology information pertaining to a most recently updated topology between the exit point and the destination and the second topology information, and constructing a least cost path segment for the area from the source to the exit point; and concatenating each least cost path segment to form an end-to-end path.

3. The method of claim 2 wherein each least cost path segment comprises a series of routers and links or networks between routers.

4. The carrier of claim 2 wherein the identifying step further comprises identifying all exit points from the current area through which the destination is reachable.

5. A computer-readable carrier containing instructions thereon that are capable of instructing a computing device to perform the steps of:

for each current area in a multi-area routing domain along a path of travel, wherein the path of travel has an origin and a destination:

receiving first topology information pertaining to at least one non-local area, identifying a source for the current area, wherein if the current area includes the origin, the source for the current area is the origin, wherein if the current area does not include the origin, the source for the current area corresponds to an exit point for a previous area along the path of travel, identifying one or more exit points from the current area through which the destination is reachable, determining second topology information based on the source and the one or more exit points, selecting an exit point from the one or more exit points, wherein the selected exit point represents a least cost path to the destination based on the first topology information pertaining to a most recently updated topology between the exit point and the destination and the second topology information, and constructing a least cost path segment for the area from the source to the exit point; and concatenating each least cost path segment to form an end-to-end path.

6. The method of claim 5 wherein each least cost path segment comprises a series of routers and links or networks between routers.

7. The carrier of claim 5 wherein the identifying step further comprises identifying all exit points from the current area through which the destination is reachable.

8. A method of identifying a path of travel for a packet in a multi-area domain operated according to a link state routing protocol, the method comprising:

receiving topology information from a plurality of individual areas in a domain; and generating an end-to-end path from a starting address to a destination address, wherein generating the end-to-end path comprises:

setting an area starting point to the starting address, identifying a plurality of intra-area paths from the area starting point based on the topology information, selecting an intra-area least cost path from the plurality of intra-area paths, wherein the intra-area least cost path includes an exit point, concatenating the intra-area least cost path to the end-to-end path, if the exit point does not correspond to the destination address:

choosing a next area based on the exit point, wherein the area starting point for the next area corresponds to the exit point, and repeating the identifying, selecting and concatenating steps for the next area, and if the exit point corresponds to the destination address, returning the end-to-end path.

9. The method of claim 8 wherein each intra-area least cost path comprises a series of routers and links or networks between routers.

10. The method of claim 8 wherein the identifying step further comprises identifying all exit points from an area through which the destination address is reachable.

11. A computer-readable carrier containing instructions thereon that are capable of instructing a computing device to perform the following steps:

receiving topology information from a plurality of individual areas in a domain; and generating an end-to-end path from a starting address to a destination address, wherein generating the end-to-end path comprises:

setting an area starting point to the starting address, identifying a plurality of intra-area paths from the area starting point based on the topology information, selecting an intra-area least cost path from the plurality of intra-area paths, wherein the intra-area least cost path includes an exit point, concatenating the intra-area least cost path to the end-to-end path, if the exit point does not correspond to the destination address:

choosing a next area based on the exit point, wherein the area starting point for the next area corresponds to the exit point, and repeating the identifying, selecting and concatenating steps for the next area, and if the exit point corresponds to the destination address, returning the end-to-end path.

12. The carrier of claim 11 wherein each intra-area least cost path comprises a series of routers and links or networks between routers.

13. The carrier of claim 11 wherein the identifying step further comprises identifying all exit points from an area through which the destination address is reachable.

14. A method of storing historical routing information in a routing domain operating according to a link state routing protocol, comprising:

storing a plurality of routing events advertised in a routing domain as they are received over time;

identifying a number of routing events for which a complete context of routing and topology information of the routing domain will be maintained;

if the number of routing events identified in the identifying step is reached, constructing at least one time-stamped routing information context by storing data structures representing current topology and routing state of the routing domain; and constructing a time ordered list of routing events as the events are received over time until the number of routing events identified in the identifying step is reached.

15. The method of claim 14, wherein the routing domain comprises a multi-area routing domain, the time-stamped routing information contexts are logically partitioned through the separate storage of information pertaining to each area in the routing domain, and where the constructing step comprises constructing a separate time ordered list of routing events for each area in the routing domain.

16. A method of identifying path information in a routing domain operating according to a link state routing protocol, comprising:

storing a plurality of routing events advertised in a routing domain as they are received over time;

identifying a number of routing events for which a complete context of routing and topology information of the routing domain will be maintained;

if the number of routing events identified in the identifying step is reached, constructing at least one time-stamped routing information context by storing data structures representing current topology and routing state of the routing domain;

constructing a time ordered list of routing events as the events are received over time until the number of routing events identified in the identifying step is reached;

specifying a starting point in the routing domain, a destination address in the routing domain, and a starting time;

reviewing the time-stamped routing information contexts to identify the context having a time stamp that is latest yet still precedes contexts with a time-stamp preceding the starting time;

constructing at least one updated time-stamped routing information context by sequentially processing routing events from the time ordered list of routing events associated with the time-stamped routing information context until reaching the last routing event having a time-stamp that precedes the starting time; and constructing path information between the starting point and the destination address using the updated time-stamped routing information context.

* * * * *

UNITED STATES PATENT AND TRADEMARK OFFICE
CERTIFICATE OF CORRECTION

PATENT NO.         : 7,525,920 B2
APPLICATION NO. : 10/895156
DATED                 : April 28, 2009
INVENTOR(S)       : Roch Guerin and Rajendran Rajan It is certified that error appears in the above-identified patent and that said Letters Patent is hereby corrected as shown below:

On the Title Page
Item (73) Assignee: should read "Iptivia, Inc., Philadelphia, PA (US)"

Signed and Sealed this

Twenty-third Day of June, 2009

JOHN DOLL
*Acting Director of the United States Patent and Trademark Office*